United States Patent
Xu et al.

(10) Patent No.: US 12,469,482 B2
(45) Date of Patent: *Nov. 11, 2025

(54) METHOD, APPARATUS, STORAGE MEDIUM AND ELECTRONIC DEVICE FOR SPEECH SYNTHESIS

(71) Applicant: BEIJING YOUZHUJU NETWORK TECHNOLOGY CO. LTD., Beijing (CN)

(72) Inventors: Chenchang Xu, Beijing (CN); Junjie Pan, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 317 days.

This patent is subject to a terminal disclaimer.

(21) Appl. No.: 18/042,077

(22) PCT Filed: Oct. 25, 2021

(86) PCT No.: PCT/CN2021/126138
§ 371 (c)(1),
(2) Date: Feb. 17, 2023

(87) PCT Pub. No.: WO2022/095743
PCT Pub. Date: May 12, 2022

(65) Prior Publication Data
US 2023/0317055 A1    Oct. 5, 2023

(30) Foreign Application Priority Data
Nov. 3, 2020  (CN) .......................... 202011211084.5

(51) Int. Cl.
*G10L 13/08* (2013.01)
*G10L 13/02* (2013.01)
(Continued)

(52) U.S. Cl.
CPC .............. *G10L 13/04* (2013.01); *G10L 13/08* (2013.01)

(58) Field of Classification Search
CPC ....... G10L 13/04; G10L 13/08; G10L 13/047; G10L 13/02; G10L 13/033
See application file for complete search history.

(56) References Cited

U.S. PATENT DOCUMENTS 11,410,684 B1 *  8/2022  Klimkov ................. G10L 25/78
2011/0202345 A1   8/2011  Meyer et al.
(Continued)

FOREIGN PATENT DOCUMENTS

CN    101359473 A    2/2009
CN    102254554 A    11/2011
(Continued)

OTHER PUBLICATIONS

International Patent Application No. PCT/CN2021/126138; Int'l Search Report; dated Jan. 26, 2022; 3 pages.
(Continued)

*Primary Examiner* — Pierre Louis Desir
*Assistant Examiner* — Cody Douglas Hutcheson
(74) *Attorney, Agent, or Firm* — BakerHostetler

(57) ABSTRACT

The present disclosure relates to a method, apparatus, storage medium and electronic device for speech synthesis. The present disclosure enables: acquiring a text to be synthesized with a target tone label, target tone label being a tone label of a first speaker or a tone label of a second speaker; inputting the text into a speech synthesis model to obtain audio information corresponding to the text, training samples of speech synthesis model including a first sample text marked with stress words and a first sample audio of first speaker for the first sample text, and a second sample text with no stress word marked and a second sample audio (Continued)

of the second speaker for the second sample text, and the speech synthesis model is configured to determine stress words in the text, and generate audio information corresponding to the text according to the stress words and the target tone label.

20 Claims, 9 Drawing Sheets

(51) Int. Cl.
*G10L 13/033* (2013.01)
*G10L 13/04* (2013.01)
*G10L 13/047* (2013.01)

(56) References Cited

U.S. PATENT DOCUMENTS

| | | | |
|---|---|---|---|
| 2017/0358293 A1* | 12/2017 | Chua | G10L 13/0335 |
| 2019/0172443 A1 | 6/2019 | Shechtman et al. | |
| 2020/0082807 A1 | 3/2020 | Kim et al. | |
| 2020/0152194 A1* | 5/2020 | Jeong | G10L 13/047 |
| 2020/0394998 A1* | 12/2020 | Kim | G10L 13/10 |
| 2021/0035551 A1* | 2/2021 | Stanton | G10L 13/04 |
| 2021/0097976 A1* | 4/2021 | Chicote | G10L 13/10 |
| 2021/0225358 A1* | 7/2021 | Monge Alvarez | G10L 15/187 |
| 2021/0350795 A1* | 11/2021 | Kenter | G10L 15/02 |
| 2022/0051654 A1* | 2/2022 | Finkelstein | G06N 3/044 |
| 2022/0068259 A1* | 3/2022 | Pan | G10L 25/63 |

FOREIGN PATENT DOCUMENTS

| | | | |
|---|---|---|---|
| CN | 105304080 | A | 2/2016 |
| CN | 107705783 | A | 2/2018 |
| CN | 110136690 | A | 8/2019 |
| CN | 110148398 | A | 8/2019 |
| CN | 110264992 | A | 9/2019 |
| CN | 111161702 | A | 5/2020 |
| CN | 111667810 | A | 9/2020 |
| CN | 112309366 | A | 2/2021 |
| JP | 2008-046636 | A | 2/2008 |
| WO | WO 2020/027619 | A1 | 2/2020 |

OTHER PUBLICATIONS

Meng et al.; "The prominence analysis and synthesis of emphasis in Putonghua"; Acta Acustica; vol. 40 No. 1; Jan. 2015; 11 pages (contains English Abstract).

Wang et al.; "Tacotron: Towards End-to-End Speech Synthesis"; Computation and Language; arXiv:1703.10135; Apr. 2017; 10 pages.

Minematsu et al.; "Automatic Estimation of Accentual Attribute Values of Words to Realize Accent Sandhi in Japanese Text-to-Speech Conversion"; IEEE Workshop on Speech Synthesis; 2002; p. 107-110.

* cited by examiner

METHOD, APPARATUS, STORAGE MEDIUM AND ELECTRONIC DEVICE FOR SPEECH SYNTHESIS

CROSS-REFERENCE TO RELATED APPLICATIONS

This application is a U.S. National Stage Application under 35 U.S.C. § 371 of PCT International Application No. PCT/CN2021/126138 filed on Oct. 25, 2021, which is based on and claims priority of Chinese Patent Application No. 202011211084.5, filed to the China National Intellectual Property Administration on Nov. 3, 2020, the disclosure of both of which are incorporated by reference herein in their entireties.

TECHNICAL FIELD

The present disclosure relates to the field of speech synthesis technology, and in particular, to a method, apparatus, storage medium and electronic device for speech synthesis.

BACKGROUND

Speech synthesis, also known as Text To Speech (TTS), is a technology that can convert any input text into corresponding speech. Traditional speech synthesis systems usually include two modules: front-end and back-end. The front-end module mainly analyzes input text and extracts linguistic information needed by the back-end module. The back-end module generates a speech waveform through a certain method according to the analysis results from the front-end.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

In a first aspect, the present disclosure provides a method for speech synthesis, the method comprising:
  acquiring a text to be synthesized with a target tone label, the target tone label being a tone label of a first speaker or a tone label of a second speaker;
  inputting the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text;
  The speech synthesis model is configured to generate audio information corresponding to the text to be synthesized according to the stress words in the text to be synthesized and the target tone label.

In a second aspect, the present disclosure provides an apparatus for speech synthesis, the apparatus comprising:
  an acquisition module configured to acquire a text to be synthesized with a target tone label, the target tone label being a tone label of the first speaker or a tone label of the second speaker;
  a synthesis module configured to input the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text;
  the speech synthesis model is configured to generate audio information corresponding to the text to be synthesized according to the stress words in the text to be synthesized and the target tone label.

In a third aspect, the present disclosure provides a non-transitory computer-readable medium having a computer program stored thereon, which, when executed by a processing apparatus, implements the steps of the method in the first aspect.

In a fourth aspect, the present disclosure provides an electronic device, comprising:
  a storage apparatus having a computer program stored thereon;
  a processing apparatus configured to execute the computer program in the storage apparatus to implement the steps of the method in the first aspect.

In a fifth aspect, the present disclosure provides a computer program product comprising instructions, which, when executed by a computer, cause the computer to implement the steps of the method in the first aspect.

Other features of the present disclosure will be described in detail in the following Detailed Description section.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings.

DETAILED DESCRIPTION

Figure 1A:
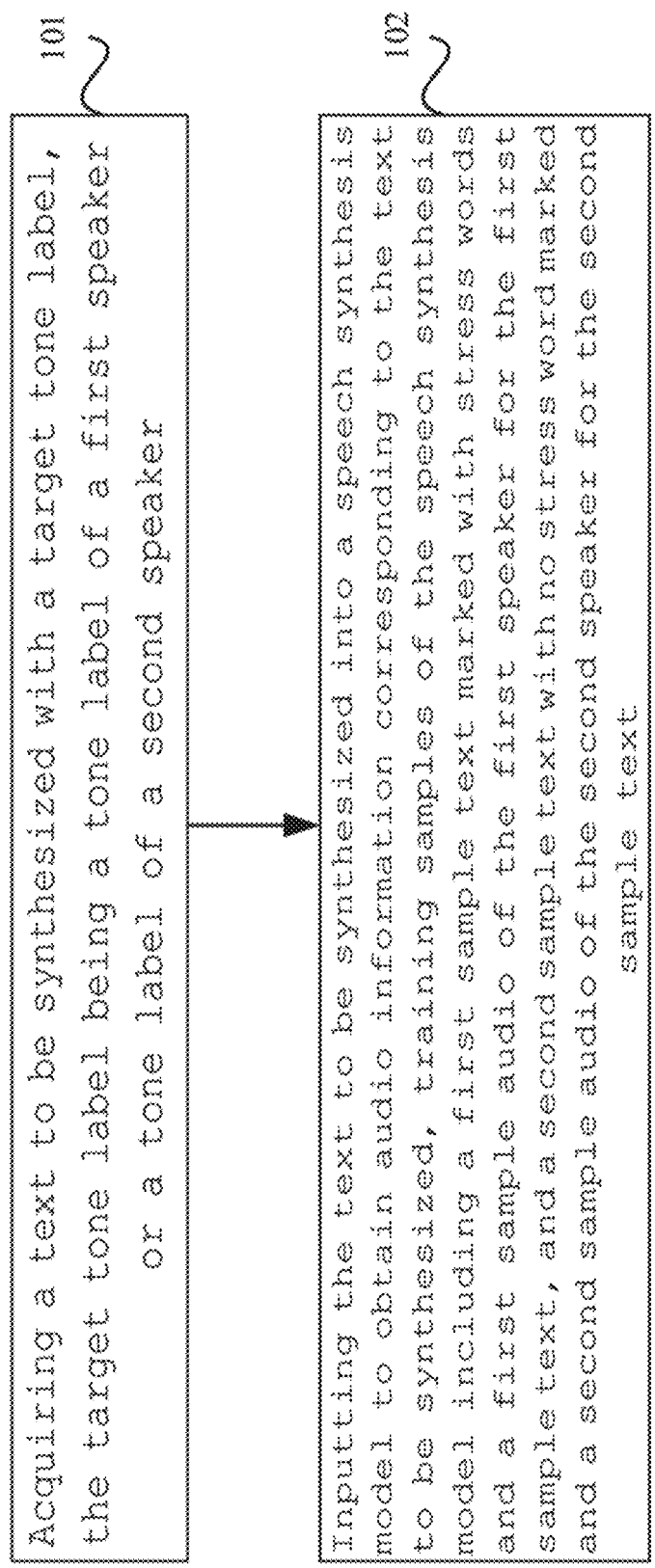
FIGS. 1A and 1B are flowcharts of a method for speech synthesis according to an exemplary embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description. It should be noted that the concepts of "first" and "second" etc. mentioned in the present disclosure are only used to distinguish between different apparatus, modules or units, and are not used to limit the order of functions performed by these apparatus, modules or units or their interdependence. In addition, it should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

Speech synthesis methods in the related arts usually do not consider stresses in synthesized speech, resulting in no stress in the synthesized speech, flat pronunciation and lack of expressiveness. Or, the speech synthesis methods in the related arts usually randomly select words in an input text to add stresses, resulting in incorrect pronunciations of stresses in the synthesized speech, and failing to obtain a better speech synthesis result containing stresses.

In view of this, the present disclosure provides a method, apparatus, storage medium and electronic device for speech synthesis, which, with a new approach for speech synthesis, enables stressed pronunciations to be included in a synthesized speech, and the tone of the synthesized speech to be controlled, thereby synthesizing a speech with stresses having a specified tone, and improving the accuracy of stresses in the synthesized speech.

FIG. 1A is a flowchart of a method for speech synthesis according to an exemplary embodiment of the present disclosure. With reference to FIG. 1A, the method for speech synthesis comprises:

Step 101, acquiring a text to be synthesized with a target tone label, the target tone label being a tone label of a first speaker or a tone label of a second speaker;

Step 102: inputting the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text;

The speech synthesis model is configured to generate audio information corresponding to the text to be synthesized according to the stress words in the text to be synthesized and the target tone label.

In the above manner, it is possible to enable a synthesized speech to include stressed pronunciations, and a speech synthesis model can be trained with a first sample text marked with stress words and a first sample audio of a first speaker for the first sample text, therefore, compared to the way of randomly adding stressed pronunciations in the related arts, the accuracy of stressed pronunciations in generated audio information can be guaranteed to a certain extent. In addition, with above methods, stress pronunciation habit of the first speaker can be transferred to a synthesized speech corresponding to a second speaker, that is, a synthesized speech of which stress pronunciation habit is that of the first speaker and of which tone is that of the second speaker can be obtained, thereby synthesizing a speech with stresses having a specified tone, and in a case that an audio with stresses of the second speaker needs to be used, it is no longer necessary to manually record the audio with stresses by the second speaker, thereby reducing the labor and time taking for acquiring the audio with stresses.

Figure 1B:
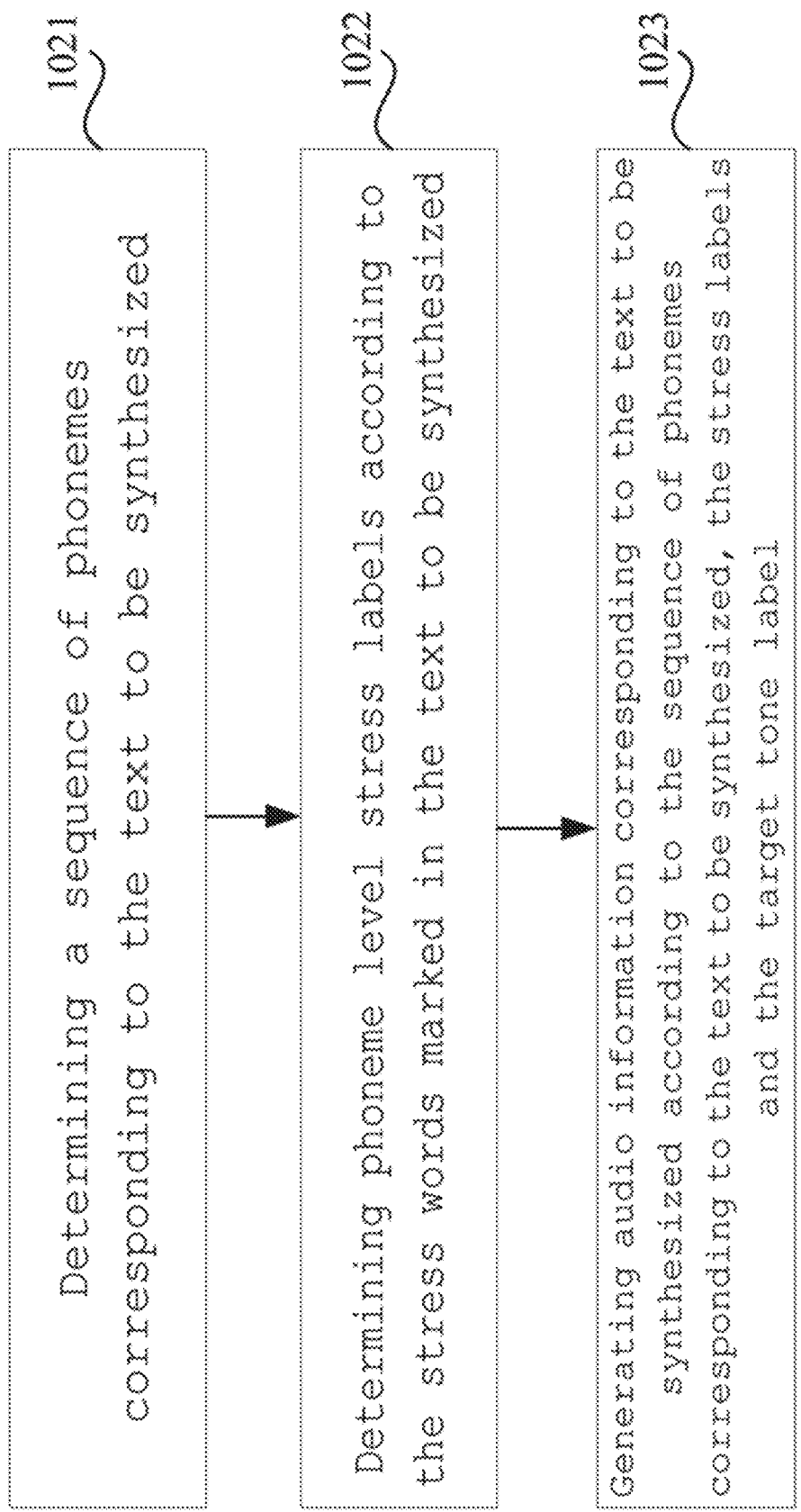

According to some embodiments of the present disclosure, referring to FIG. 1B, the method for speech synthesis may comprise employing a speech synthesis model for processing a text to be synthesized in the following manner, including:

Step 1021, determining a sequence of phonemes corresponding to the text to be synthesized;

Step 1022, determining phoneme level stress labels according to the stress words in the text to be synthesized;

Step 1023, generating audio information corresponding to the text to be synthesized according to the sequence of phonemes corresponding to the text to be synthesized, the stress labels and the target tone label.

With the above manner, a speech synthesis model can be trained according to sample texts marked with stress words and sample audios corresponding to the sample texts, and the trained speech synthesis model can generate audio information including stressed pronunciations according to the text to be synthesized marked with stress words. Moreover, since the speech synthesis model is obtained by training according to a large number of sample texts marked with stress words, the accuracy of generated audio information can be guaranteed to a certain extent compared to the way of randomly adding stressed pronunciations in the related arts. In addition, with the above manner, the speech synthesis model can perform speech synthesis processing according to the situation of expanding the text to be synthesized to the phoneme level, so stresses in the synthesized speech can be controlled at the phoneme level, thereby further improving the accuracy of stressed pronunciations in the synthesized speech.

According to the embodiment of the present disclosure, stress words in a text to be synthesized may be determined in various appropriate ways. In some embodiments, stress words in a text to be synthesized may be determined by a speech synthesis model, and in other embodiments, stress words in a text to be synthesized may be determined by manual annotation. This will be described in detail later.

In order to make those skilled in the art better understand the method for speech synthesis provided by the present disclosure, the above steps are described in detail below.

First, a process for training a speech synthesis model will be described.

As an example, a plurality of first sample texts and first sample audios of a first speaker for the plurality of first sample texts, and a plurality of second sample texts and second sample audios of a second speaker for the plurality of second sample texts for training may be acquired in advance, wherein each of the first sample texts is marked with stress words, and each of the second sample texts is not marked with stresses, that is, each of the first sample texts is marked with words that require stressed pronunciations, while each of the second sample texts is not marked with words that require stressed pronunciations.

In some embodiments of the present disclosure, stress words marked in a first sample text may be determined by: first acquiring a plurality of first sample texts, each first sample text including stress words marked with initial stress labels; then for each stress word marked with the initial stress label, if the stress word is marked as a stress word in each of the first sample texts, adding a target stress label to the stress word, if the stress word is marked as a stress word in at least two first sample texts, in a case that fundamental frequency of the stress word is greater than a preset fundamental frequency threshold and energy of the stress word is greater than a preset energy threshold, adding a target stress label to the stress word; and finally, for each of the first sample texts, determining stress words in the first sample text added with the target stress label as stress words in the first sample text.

According to some embodiments of the present disclosure, the plurality of first sample texts may be sample texts including the same content and marking initial stress labels by different users, or the plurality of first sample texts may be a plurality of first sample texts including different content and the texts including the same content being marked initial stress labels by different users, etc., which are not limited in the embodiment of the present disclosure. It should be understood that, in order to improve the accuracy of the results, it is preferable that the plurality of first sample texts are a plurality of texts including different contents and the texts including the same contents being marked initial stress labels by different users.

For example, firstly, time boundary information of each word in a first sample text in a first sample audio can be acquired through an automatic alignment model, so as to obtain time boundary information of each word and each prosodic phrase in the first sample text. Then, a plurality of users can mark stress words at prosodic phrase level according to the aligned first sample audio and first sample text, in combination with auditory sense, waveform graph, spectrum, and semantic information acquired from the first sample text, obtaining a plurality of first sample texts marked with stress words. Where, prosodic phrases are intermediate rhythmic chunks between prosodic words and intonation phrases. Prosodic words are a group of syllables that are closely related in actual speech flow and are often pronounced together. Intonation phrases connect several prosodic phrases according to a certain intonation pattern, generally corresponding to sentences in syntax. In the embodiment of the present disclosure, initial stress labels in a first sample text may correspond to prosodic phrases, so as to obtain the initial stress labels at the prosodic phrase level, such that stressed pronunciations are more in line with conventional pronunciation habits.

In the embodiment of the present disclosure, or in other possible situations, initial stress labels in a first sample text may correspond to a single letter or word, so as to obtain stresses at word level or stresses at single letter level, etc. In specific implementation, chooses can be made as needed.

After obtaining a plurality of first sample texts with initial stress labels, the initial stress labels in the plurality of first sample texts can be integrated. Specifically, for each stress word marked with an initial stress label, if the stress word is marked as a stress word in every first sample text, it means that the marking result of this stress is relative accurate, so a target stress label can be added to the stress word. If the stress word is marked as a stress word in at least two first sample texts, it means that there is situation that the stress word is not marked as a stress word in other first sample texts, which indicates that there may be a certain deviation in the marking result of this stress. In this case, in order to improve the accuracy of the results, further judgment can be made. Specifically, considering that the fundamental frequency of a stressed pronunciation in an audio is higher than that of an unstressed pronunciation, and the energy of a stressed pronunciation in an audio is higher than that of an unstressed pronunciation, so in a case that the fundamental frequency of the stress word is higher than a preset fundamental frequency threshold and the energy of the stress word is greater than a preset energy threshold, a target stress label is added to the stress word. Wherein, the preset fundamental frequency threshold and the preset energy threshold may be set according to actual situations, which are not limited in the embodiment of the present disclosure.

It should be understood that, in other possible cases, if a stress word is not marked as a stress in all other first sample texts, it means that the stress word is less likely to have stress, so that no target stress label can be added to the stress word.

With above manner, stress mark screening can be performed on first sample texts marked with initial stress labels, that is, first sample texts added with target stress labels can be obtained, so that for each first sample text, stress words added with target stress labels can be determined as stress words in the first sample text, so that stress label information in first sample texts is more accurate.

After the first sample texts marked with stress words are obtained, a speech synthesis model can be trained according to the plurality of first sample texts marked with stress words and a plurality of first sample audios corresponding to the plurality of first sample texts respectively, and second sample texts with no stress word marked and a plurality of second sample audios corresponding to the plurality of second sample texts respectively.

Figure 1C:
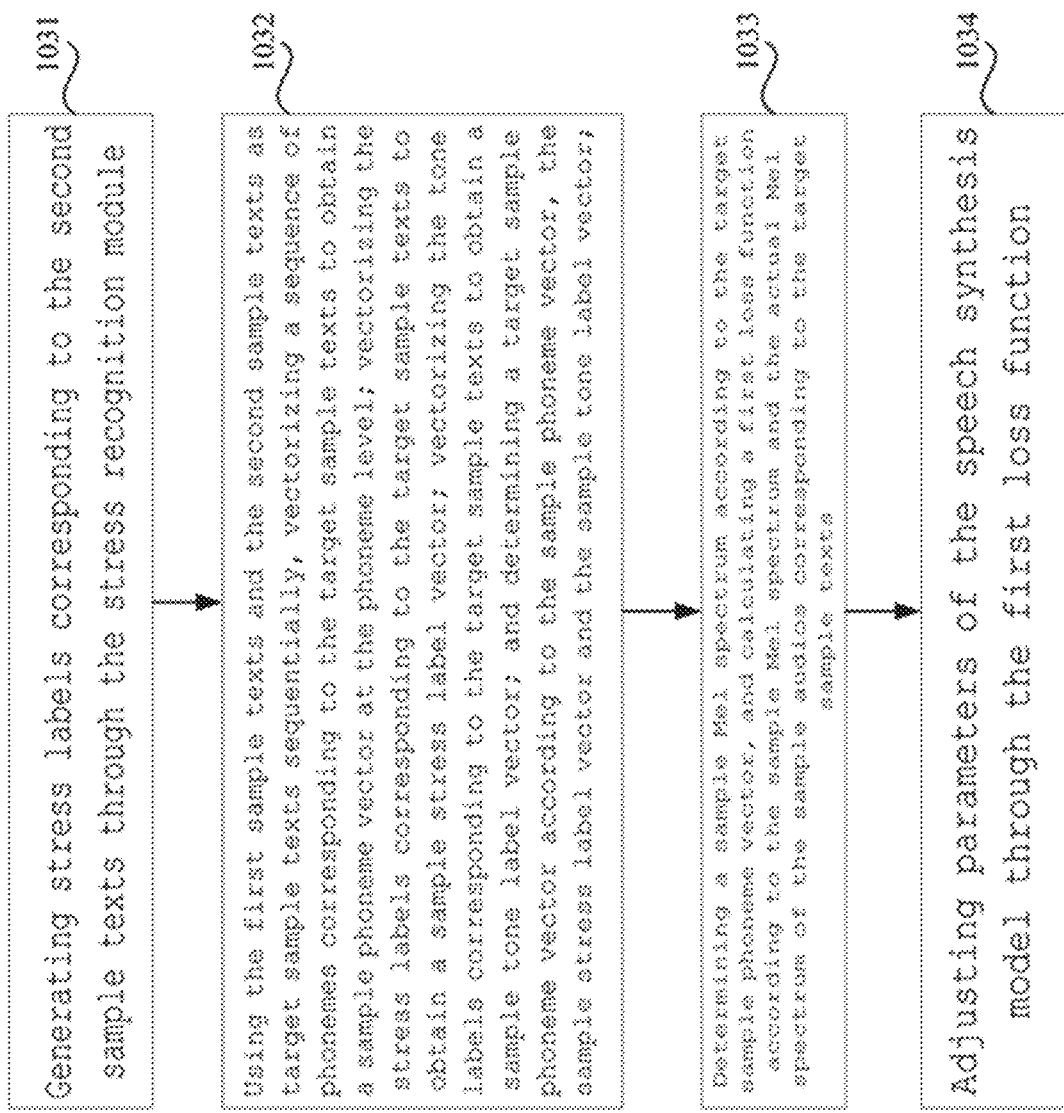
FIGS. 1C and 1D are flowcharts of a process for training a speech synthesis model according to an exemplary embodiment of the present disclosure.

In some embodiments of the present disclosure, referring to FIG. 1C, a process for training the speech synthesis model may comprise:

Step 1031, generating stress labels corresponding to the second sample texts, in some embodiments, the speech synthesis model may include a stress recognition module, and accordingly, the stress labels corresponding to the second sample texts may be generated by the stress recognition module, Step 1032, using the first sample texts and the second sample texts as target sample texts sequentially, vectorizing a sequence of phonemes corresponding to the target sample texts to obtain a sample phoneme vector at the phoneme level, vectorizing the stress labels corresponding to the target sample texts to obtain a sample stress label vector, vectorizing the tone labels corresponding to the target sample texts to obtain a sample tone label vector, and determining a target sample phoneme vector according to the sample phoneme vector, the sample stress label vector and the sample tone label vector, Step 1033: determining a sample Mel spectrum according to the target sample phoneme vector, and calculating a first loss function according to the sample Mel spectrum and the actual Mel spectrum of the sample audios corresponding to the target sample texts, Step 1034: adjusting parameters of the speech synthesis model through the first loss function.

As an example, the stress recognition module may be used to recognize stress words in the second sample text with no stress word marked, and output corresponding stress labels. Wherein, the stress labels can be represented by 0 and 1. For example, 0 can be used to represent that no stress is marked, and 1 can be used to represent that there is marked with stress, so that stress labels represented as 0 and 1 are obtained. For the training of the stress recognition module, it can be a joint training through the first sample texts marked with stress words in the process of training the speech synthesis model, or it can also be a joint training through sample texts marked with stress words that are different with the first sample texts in the process of training the speech synthesis model, which is not limited in the embodiment of the present disclosure. It should be understood that, in order to reduce the amount of sample acquisitions, it is preferable to jointly train the stress recognition module through the first sample texts marked with stress words.

As an example, after generating stress labels corresponding to the second sample texts by the stress recognition module, the first sample texts and the second sample texts can be sequentially used as the target sample texts, and a sequence of phonemes corresponding to the target sample texts can be vectorized to obtain a sample phoneme vector. It should be understood that phonemes are the smallest phonetic units divided according to natural properties of speech, and are divided into two categories: vowels and consonants. For Chinese, phonemes include initials (initials are consonants that are used in front of finals and form a complete syllable with the finals) and finals (that is, vowels). For English, phonemes include vowels and consonants. In the embodiment of the present disclosure, a sequence of phonemes corresponding to a target sample text are vectorized to obtain a sample phoneme vector, and in the subsequent process, a speech with the phoneme level stress can be synthesized, so that stresses in the synthesized speech is controllable at phoneme level, thereby further improving the accuracy of stressed pronunciations in the synthesized speech. Wherein, the process of vectorizing the sequence of phonemes corresponding to the target sample text to obtain the sample phoneme vector is similar to the method for vector conversion in the related arts, which will not be repeated here.

As an example, if a target sample text is the first sample text, stress labels corresponding to the target sample text can be determined by: first determining a sequence of phonemes corresponding to the target sample text, and then marking stresses in the sequence of phonemes corresponding to the target sample text according to the stress words marked in the target sample text, so as to obtain phoneme level stress labels corresponding to the target sample text. It should be noted that stress labels corresponding to the first sample text may be determined in advance, for example, before the process of model training; or determined in the above step 1041, or determined in the current step. This stress labels can then be vectorized to obtain a sample stress label vector. If the target sample text is the second sample text, stress labels corresponding to the target sample text can be obtained through the stress recognition module. Wherein, the method of vectorizing stress labels to obtain a sample stress label vector is similar to that of vector conversion in the related art, which will not be repeated here.

In the embodiment of the present disclosure, in order to synthesize a speech with a specified tone, in the training phase of a speech synthesis model, a tone label of a first speaker can also be extracted from a first sample audio for model training, and a tone label of a second speaker can also be extracted from a second sample audio for model training. Specifically, after a first sample text and a second sample text are sequentially used as target sample texts, tone labels corresponding to the target sample texts may be vectorized to obtain a sample tone label vector. For example, if the target sample texts are the first sample texts, the tone labels extracted from the first sample audios are vectorized to obtain the sample tone label vector. If the target sample texts are the second sample texts, the tone labels extracted from the second sample audios are vectorized to obtain the sample tone label vector.

After obtaining the sample phoneme vector, the sample stress label vector, and the sample tone label vector, considering that the sample phoneme vector, the sample stress label vector, and the sample tone label vector characterize three independent pieces of information, the target sample phoneme vector can be obtained by means of splicing the sample phoneme vector, the sample stress label vector and the sample tone label vector, instead of obtaining the target sample phoneme vector by adding the sample phoneme vector, the sample stress label vector and the sample tone label vector, so as to avoid destroying the content independence between the sample phoneme vector, the sample stress label vector and the sample tone label vector, and ensure the accuracy of the results output by the speech synthesis model.

After obtaining the target sample phoneme vector, a sample Mel spectrum can be determined according to the target sample phoneme vector. In some embodiments of the present disclosure, the target sample phoneme vector may be input into an encoder, and a vector output by the encoder may be input into an decoder to obtain the sample Mel spectrum; wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme. Alternatively, a frame level vector corresponding to the vector output by the encoder can also be determined by an automatic alignment model, and then the frame level vector can be input into the decoder to obtain the sample Mel spectrum, wherein the automatic alignment model is used to make the phoneme level pronunciation information in the sample text corresponding to the target sample phoneme vector in one-to-one correspondence with the frame time of each phoneme in the sample audio corresponding to the target sample phoneme vector, so as to improve the model training effect, thereby further improving the accuracy of stressed pronunciations in the synthesized speech by the model.

Figure 2:
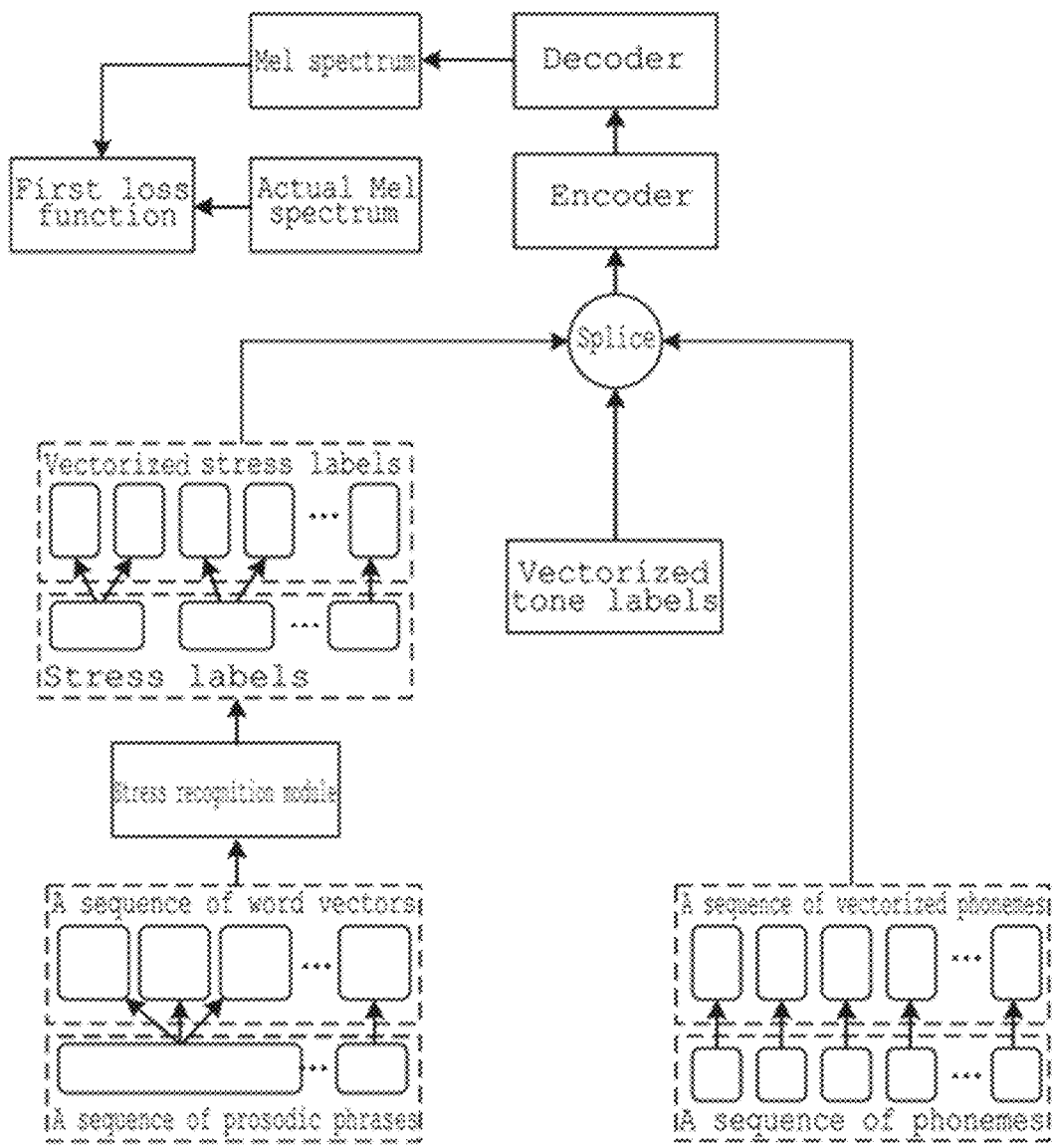
FIG. 2 is a schematic diagram of a speech synthesis model in a method for speech synthesis according to an exemplary embodiment of the present disclosure.

As an example, the speech synthesis model may be an end-to-end speech synthesis Tacotron model, accordingly, the encoder may be the encoder in the Tacotron model, and the decoder may be the decoder in the Tacotron model. For example, the speech synthesis model is shown in FIG. 2. In the training phase of the speech synthesis model, a sequence of phonemes corresponding to a target sample text can be vectorized to obtain a vectorized phoneme sequences (i.e., a sample phoneme vector). In addition, the speech synthesis model can divide a first sample text marked with stress words at a prosodic phrase level to obtain a sequence of prosodic phrases, and then a sequence of word vectors can be generated according to the sequence of prosodic phrases, and the sequence of word vectors is input into a stress recognition module to train the stress recognition module. Then, stress labels output by the stress recognition module can be vectorized to obtain vectorized stress labels (i.e., a sample stress label vector). At the same time, tone labels corresponding to the sample audios corresponding to the target sample text can also be vectorized to obtain vectorized tone labels (i.e., a sample tone labels).

Next, a target sample phoneme vector can be obtained by splicing the sample phoneme vector, the sample stress label vector and the sample tone label vector, and the target sample phoneme vector is input into an encoder (Encoder) to obtain pronunciation information of each phoneme in the sequence of phonemes corresponding to the target sample phoneme vector. For example, if a sequence of phonemes corresponding to a target sample phoneme vector includes a phoneme "jin", it is necessary to know that the pronunciation of the phoneme is the same as "今". Then, phoneme level and frame level alignment can be achieved through an automatic alignment model, obtaining a frame level target sample vector corresponding to the vector output by the encoder. Next, the target sample vector can be input into a decoder (Decoder), so that the decoder performs conversion processing according to the pronunciation information of each phoneme in the sequence of phonemes corresponding to the target sample vector, to obtain a sample Mel spectrum corresponding to each phoneme (Mel spectrum).

In other embodiments of the present disclosure, considering that setting the vector splicing process before the encoder needs to calculate the stress recognition module first, and then calculate the encoder, the processing speed will be affected. Therefore, in order to improve the processing speed, referring to FIG. 3, the vector splicing process can also be set after the encoder, so that the stress recognition module and the encoder can be calculated in parallel. That is to say, in the training phase of the speech synthesis model, the sample phoneme vector can be input into the encoder first, and then the target sample phoneme vector can be determined according to the vector output by the encoder, the sample stress label vector, and the sample tone label vector. Accordingly, determining the sample Mel spectrum according to the target sample phoneme vector may be: inputting the target sample phoneme vector into the decoder to obtain the sample Mel spectrum. In this way, the stress recognition module and the encoder can be calculated in parallel, thereby improving the calculation speed of the speech synthesis model, further improving the efficiency of speech synthesis.

After obtaining the sample Mel spectrum, a first loss function can be calculated according to the sample Mel spectrum and the actual Mel spectrum of the sample audio corresponding to the target sample text, so as to adjust parameters of the speech synthesis model through the first loss function.

In some embodiments of the present disclosure, the training step of the speech synthesis model may further comprise: calculating a second loss function according to the target sample text, and accordingly, adjusting the parameters of the speech synthesis model through the first loss function may be: adjusting the parameters of the speech synthesis model through the first loss function and the second loss function. In some embodiments, the above operations are performed based on the situation of marking of stress words in the target sample text, that is, the second loss function is calculated in a case that the target sample text is marked with stress words, and the parameters of the speech synthesis model are adjusted according to the first loss function and the second loss function.

Figure 1D:
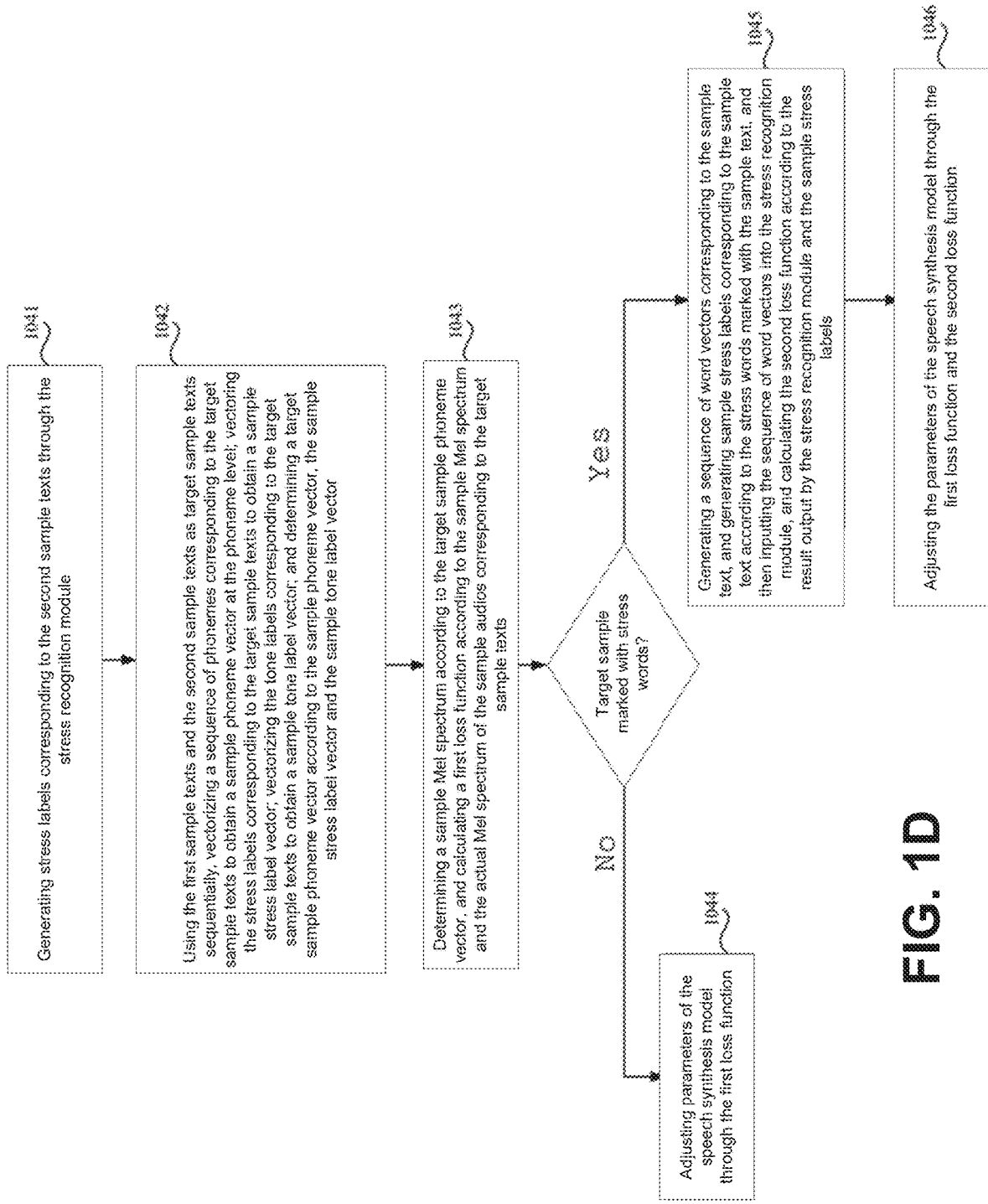

FIG. 1D shows a process for training a speech synthesis model according to other embodiments of the present disclosure, wherein the operations of steps 1041 to 1043 can be performed as described above with reference to FIG. 1C, which will not be described in detail here.

Then, it is determined whether the target sample text is marked with stress words. If the target sample text is marked with stress words, execute step 1045 of generating a sequence of word vectors corresponding to the sample text, and generating sample stress labels corresponding to the sample text according to the stress words marked with the sample text, and then inputting the sequence of word vectors into the stress recognition module, and calculating the second loss function according to the result output by the stress recognition module and the sample stress labels, and step 1046 of adjusting the parameters of the speech synthesis model through the first loss function and the second loss function. If the target sample text is not marked with stress words, execute step 1044 of adjusting the parameters of the speech synthesis model through the first loss function.

In particular, if the target sample text is not marked with stress words, the second loss function cannot be obtained by calculation. Therefore, it is possible to first determine whether the target text used for training this time is marked with stress words, and if it is marked with stress words, for example the first sample text, parameters of the speech synthesis model are adjusted according to the calculated second loss function and first loss function. If it is not marked with stress words, for example the second sample text, parameters of the speech synthesis model can be adjusted through the first loss function. Wherein, the first loss function may be an MSE loss function, and the second loss function may be a CE loss function, which are not limited in the embodiments of the present disclosure. Alternatively, an Adam optimizer can also be used to optimize the model during the process for training model, so as to ensure the accuracy of results output by the speech synthesis model after training.

In some embodiments, in a case that the target text is the first sample text, a sequence of word vectors corresponding to the first sample text is generated, and sample stress labels corresponding to the first sample text are generated according to the stress words marked with the first sample text, and then the sequence of word vectors is input into the stress recognition module, and the second loss function is calculated according to the result output by the stress recognition module and the sample stress labels. Accordingly, adjusting parameters of the speech synthesis model through the first loss function may be: adjusting parameters of the speech synthesis model through the first loss function and the second loss function.

Figure 4:
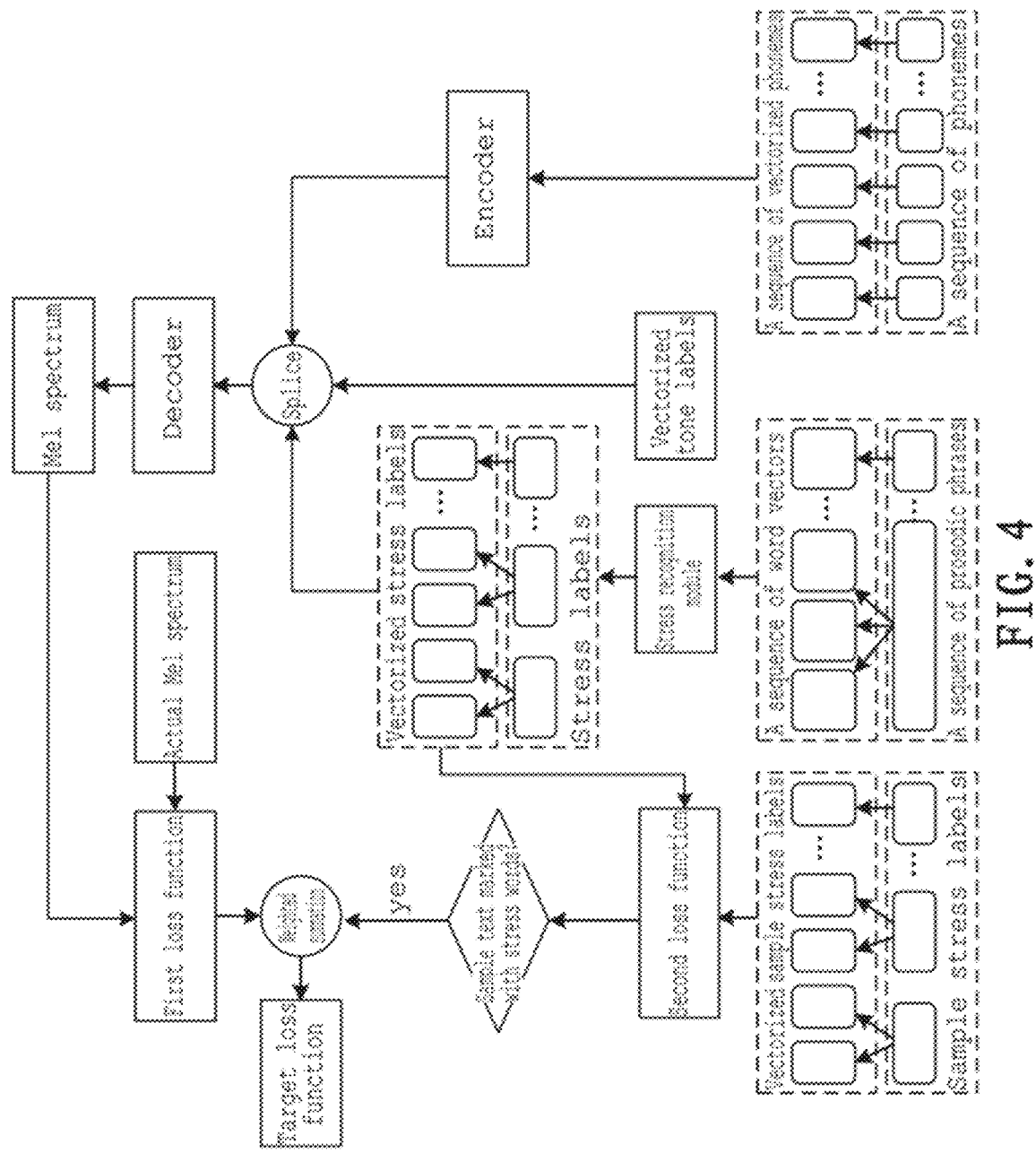
FIG. 4 is a schematic diagram of a speech synthesis model in a method for speech synthesis according to another exemplary embodiment of the present disclosure.

As an example, referring to FIG. 4, the stress recognition module may take the sequence of word vectors corresponding to the first sample text as input, and predicted word level stress labels as output. Then, a weighted second loss function can be calculated from stress labels output by the stress recognition module and the sample stress labels corresponding to the sample text. Wherein, the sequence of word vectors may be obtained by performing word segmentation processing on the first sample text and then performing vector transformation on each word segment, and the sample stress labels may be obtained by representing stress label information of each segment through 0 and 1 according to the stress words marked in the first sample text. The second loss function may be a CE loss function (Cross Entropy Loss), etc., which is not limited in the embodiments of the present disclosure. It should be understood that, considering that stresses has a sparse feature in respect to non-stresses, so in the process of calculating the second loss function, a larger weight may be set for stress labels, and a smaller weight may be set for non-stress labels.

In a case that the target text is the second sample text, since the second sample text is not marked with stress words, the second loss function cannot be obtained by calculation. Therefore, parameters of the speech synthesis model can be adjusted through the first loss function without considering the second loss function, even without calculating the second loss function.

In some embodiments of the present disclosure, adjusting parameters of the speech synthesis model through the first loss function and the second loss function may be: performing weighted summation of the first loss function and the second loss function through weight values adaptively changed during the training process to obtain a target loss function, and then adjusting parameters of the speech synthesis model according to the target loss function.

As an example, the weight values may be adaptively changed according to the order of magnitude difference between the first loss function and the second loss function in each training process. For example, in the first training process, the calculation result of the first loss function is 10, and the calculation result of the second loss function is 0.1, the difference between the two is 2 orders of magnitude, so the weight values can be numerical values to make the results of the first loss function and the second loss function to be at the same order of magnitude (for example, both are 1). In the second training process, the calculation result of the first loss function is 1, and the calculation result of the second loss function is 0.1, and the difference between the two is 1 order of magnitude. Therefore, the weight values can be numerical values to make the first loss function unchanged and the result of the second loss function to be 1, and so on. Alternatively, the weight values may also be adaptively changed according to the change degree of numerical values of the first loss function and the second loss function in each training process, and so on, which is not limited in the embodiments of the present disclosure.

The first loss function and the second loss function can be weighted and summed to obtain a target loss function through weight values adaptively changed during the training process, so that parameters of the speech synthesis model can be adjusted according to the target loss function. For example, in the above example, a CE loss function (i.e. the second loss function) and a MSE loss function (the first loss function) can be weighted and summed to obtain a target loss function through weight values adaptively changed during the training process, Then, parameters of the speech synthesis model are adjusted according to the target loss function, so as to realize the training of the speech synthesis model.

With the above manner, a speech synthesis model can be obtained by training according to a first sample text marked with stress words and a first sample audio of a first speaker for the first sample text, and a second sample text with no stress word marked and a second sample audio of the second speaker for the second sample text, and then speech synthesis can be performed on the text to be synthesized with a target tone label, wherein the target tone label is a tone label of the first speaker or a tone label of the second speaker.

Specifically, the speech synthesis model can determine stress words in a text to be synthesized, and generate audio information corresponding to the text to be synthesized according to the stress words and the target tone label. Wherein, the speech synthesis model can determine the stress words in the text to be synthesized through the trained stress recognition module. In some other embodiments of the present disclosure, considering the data difference between training texts of the stress recognition module and the text to be synthesized, the accuracy of results output by the stress recognition module may be affected. Therefore, in order to improve the accuracy of stress pronunciations in synthesized speeches, it is also possible to combine the stress recognition function with the way of manually stresses marking. That is to say, determination of stress words in the text to be synthesized by the speech synthesis model may be: first determining whether stress words are marked in the text to be synthesized, and if no stress word is marked in the text to be synthesized, stress words in the text to be synthesized are identified by a stress recognition module in the speech synthesis model, and if stress words are marked in the text to be synthesized, stress words in the text to be synthesized are determined according to marking information corresponding to the stress words.

In this way, in a case that there is no manually labeled stress words, the stress recognition module can be used to identify stress words to synthesize a speech with stresses, and in a case that stress words are marked manually, a speech with stresses are synthesized according to manually labeled stress words, to better meet the needs of speech synthesis in various scenarios, and better apply to various speech synthesis scenarios.

After stress words in the text to be synthesized are determined, audio information corresponding to the text to be synthesized can be generated according to the stress words and the target tone label. In some embodiments of the present disclosure, the speech synthesis model may first determine a sequence of phonemes corresponding to the text to be synthesized, and determine phoneme level stress labels according to the stress words, and then generate audio information corresponding to the text to be synthesized according to the sequence of phonemes, the stress labels, and the target tone label corresponding to the text to be synthesized.

It should be understood that the speech synthesis model determines the sequence of phonemes corresponding to the text to be synthesized, so that a speech with stresses can be synthesized at the phoneme level in the subsequent process, so that the stresses in the synthesized speech is controllable at the phoneme level, further improving the accuracy of stressed pronunciations in the synthesized speech.

While or after the sequence of phonemes corresponding to the text to be synthesized are determined, phoneme level stress labels may be determined according to the stress words. As an example, the stress labels may be a sequence represented by 0 and 1, where 0 means that corresponding phoneme is not marked with stress, and 1 means that the corresponding phoneme in the text to be synthesized is marked with stress. In a specific application, the sequence of phonemes corresponding to the text to be synthesized may be determined first, and then stresses marking is performed in the sequence of phonemes according to the stress words, so as to obtain a phoneme level stress labels corresponding to the text to be synthesized.

After obtaining a sequence of phonemes and stress labels corresponding to the text to be synthesized, audio information corresponding to the text to be synthesized can be generated according to the sequence of phonemes, the stress labels and the tone labels with the text to be synthesized. In some embodiments of the present disclosure, the speech synthesis model may firstly vectorize the sequence of phonemes corresponding to the text to be synthesized to obtain a phoneme vector, vectorize the stress labels to obtain a stress label vector, vectorize the target tone labels to obtain a tone label vector, then determine a target phoneme vector according to the phoneme vector, the stress label vector and the tone label vector, and determine a Mel spectrum according to the target phoneme vector, and finally input the Mel spectrum into a vocoder to obtain audio information corresponding to the text to be synthesized.

It should be understood that the process of vectorizing the sequence of phonemes corresponding to the text to be synthesized to obtain the phoneme vector, the process of vectorizing the stress labels corresponding to the text to be synthesized to obtain the stress label vector, and the process of vectorizing the target tone labels to obtain a tone label vector are similar with the method for vector conversion in the related arts, which will not be repeated here.

In the embodiment of the present disclosure, considering that the phoneme vector, the stress label vector, and the tone label vector characterize three independent pieces of information, the target phoneme vector is obtained by the way of splicing the phoneme vector, the stress label vector and the tone label vector, rather than by adding the phoneme vector, the stress label vector and the tone label vector, so as to avoid destroying the content independence between the phoneme vector, the stress label vector and the tone label vector, and ensure the accuracy of subsequent speech synthesis results.

After the target phoneme vector is obtained, a Mel spectrum (Mel spectrum) can be determined according to the target phoneme vector. In some embodiments of the present disclosure, the target phoneme vector can be input into an encoder, and a vector result output by the encoder can be input into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

For example, as shown in FIG. 2, the speech synthesis model in the embodiment of the present disclosure may include an encoder (Encoder) and a decoder (Decoder). In the application stage of the speech synthesis model, after obtaining the target phoneme vector, the target phoneme vector can be input into the encoder to obtain pronunciation information of each phoneme in the sequence of phonemes corresponding to the target phoneme vector. For example, for the phoneme "jin", it is necessary to know that the pronunciation of the phoneme is the same as " 今 ". Then, the pronunciation information can be input into the decoder, to cause the decoder to perform conversion processing according to the pronunciation information of each phoneme in the sequence of phonemes corresponding to the target phoneme vector, so as to obtain the Mel spectrum corresponding to each phoneme.

Figure 3:
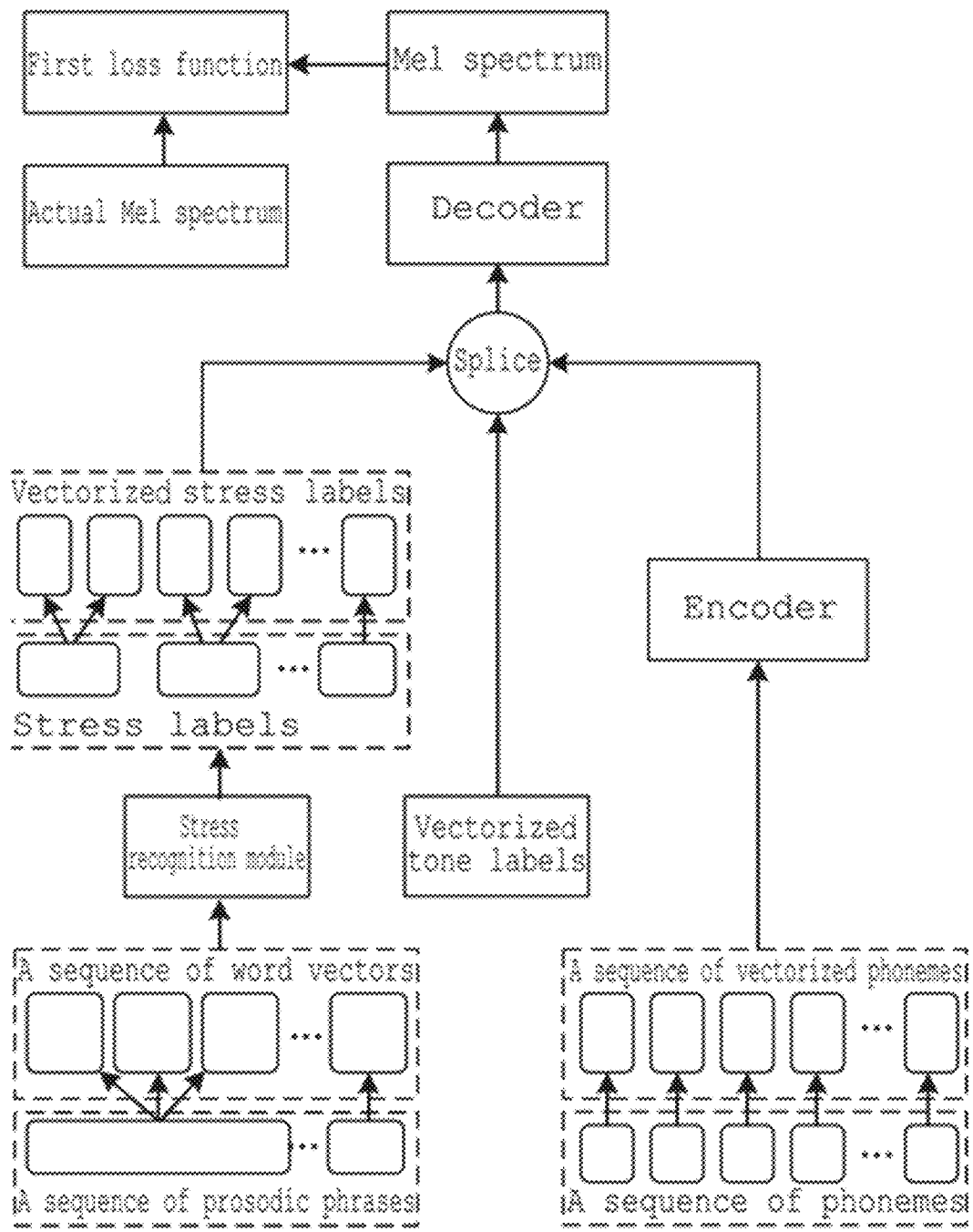
FIG. 3 is a schematic diagram of a speech synthesis model in a method for speech synthesis according to another exemplary embodiment of the present disclosure.

Alternatively, in some other embodiments of the present disclosure, in order to improve the processing speed, the splicing processing in the speech synthesis model may be set after the encoder, for example, the speech synthesis model as shown in FIG. 3. In this case, in the application stage of the speech synthesis model, determining the target phoneme vector according to the phoneme vector, the stress label vector and the tone label vector may be: first inputting the phoneme vector into the encoder, and then determining the target phoneme vector according to the vector result output by the encoder and the stress label vector, tone label vector. Accordingly, determining the Mel spectrum according to the target phoneme vector may be: inputting the target phoneme vector into the decoder to obtain the Mel spectrum.

After the Mel spectrum is determined according to the target phoneme vector, the Mel spectrum can be input into the vocoder to obtain audio information corresponding to the text to be synthesized. It should be understood that the embodiments of the present disclosure do not limit the type of the vocoder, that is to say, audio information with stresses can be obtained by inputting the Mel spectrum into any vocoder, and the stresses in the audio information can be obtained by the stress recognition module, thereby the problems of no stresses in synthesized speeches or wrong stressed pronunciations due to randomly specified stresses in the related arts can be solved, and the accuracy of stressed pronunciations in the synthesized speech can be improved. In addition, the tone of the synthesized speech can be controlled, and a speech with stresses having the tone of the first speaker or the second speaker can be synthesized.

Figure 5:
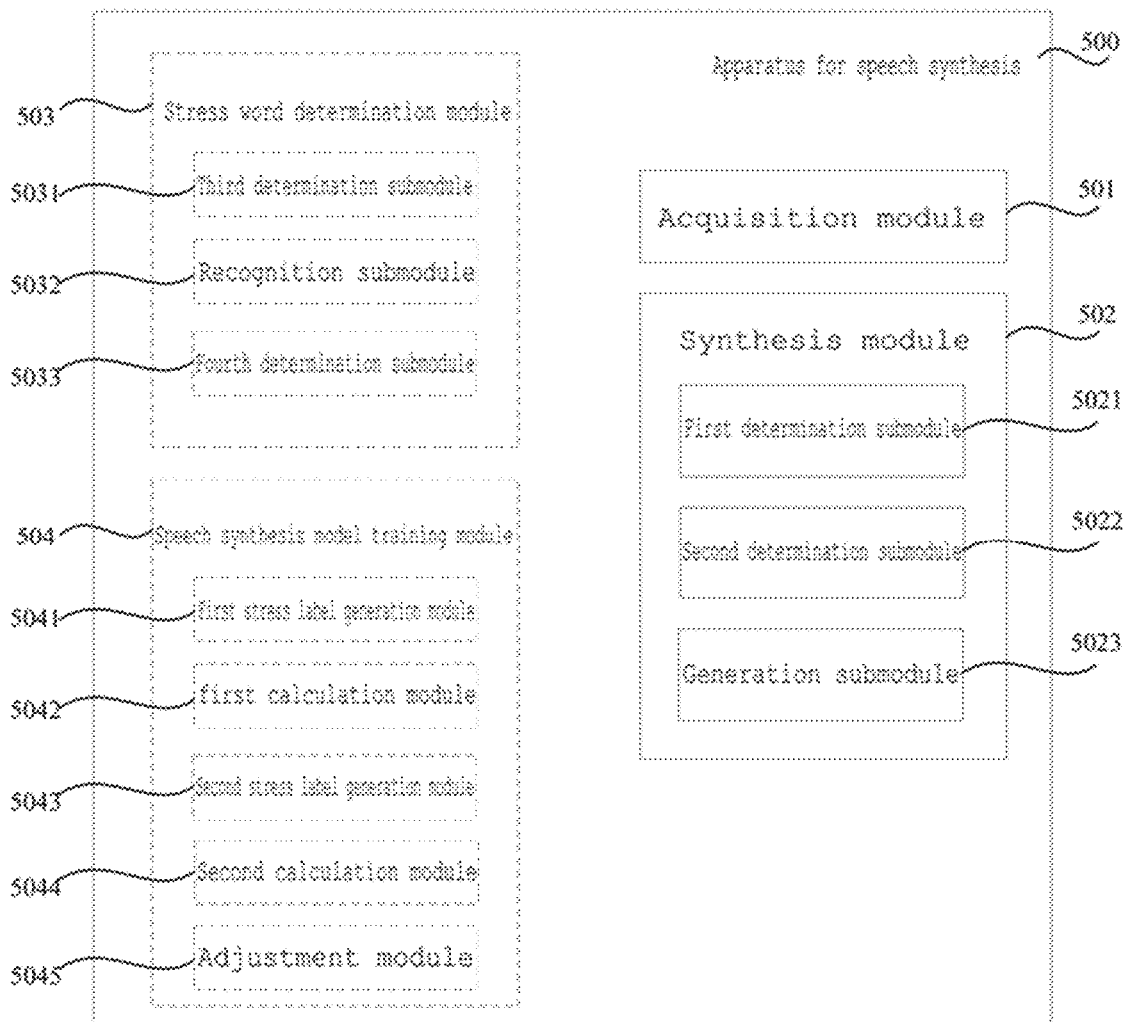
FIG. 5 is a block diagram of an apparatus for speech synthesis according to an exemplary embodiment of the present disclosure.

According to an embodiment of the present disclosure, the present disclosure further provides an apparatus for speech synthesis, which may become part or all of an electronic device through software, hardware, or a combination of the software and hardware. With reference to FIG. 5, the apparatus for speech synthesis 500 comprises:
  an acquisition module 501 configured to acquire a text to be synthesized with a target tone label, the target tone label being a tone label of a first speaker or a tone label of a second speaker;
  a synthesis module 502 configured to input the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text;
  the speech synthesis model is configured to determine stress words in the text to be synthesized, and to generate audio information corresponding to the text to be synthesized according to the stress words and the target tone label.

In some embodiments of the present disclosure, the speech synthesis model generates audio information corresponding to the text to be synthesized through following modules:
  a first determination submodule 5021 configured to determine a sequence of phonemes corresponding to the text to be synthesized;
  a second determination submodule 5022 configured to determine phoneme level stress labels according to the stress words; and
  a generation submodule 5023 configured to generate audio information corresponding to the text to be synthesized according to the sequence of phonemes corresponding to the text to be synthesized, the stress labels and the target tone label.

In some embodiments of the present disclosure, the generation submodule is configured to:
vectorize the sequence of phonemes corresponding to the text to be synthesized to obtain a phoneme vector;
vectorize the stress labels to obtain a stress label vector;
vectorize the target tone label to obtain a tone label vector;
determine a target phoneme vector according to the phoneme vector, the stress label vector and the tone label vector;
determine a Mel spectrum according to the target phoneme vector;
input the Mel spectrum into a vocoder to obtain audio information corresponding to the text to be synthesized.

In some embodiments of the present disclosure, the generation submodule is configured to:
input the target phoneme vector into an encoder, and input a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

In some embodiments of the present disclosure, the generation submodule is configured to:
input the phoneme vector into an encoder, and determine the target phoneme vector according to the vector output by the encoder, the stress label vector and the tone label vector;
input the target phoneme vector into a decoder to obtain the Mel spectrum;
wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

In some embodiments of the present disclosure, the speech synthesis model may include a stress recognition module, and the apparatus 500 may further include a speech synthesis model training module 504, which may include:
a first stress label generation module 5041 configured to generate stress labels corresponding to the second sample text through the stress recognition module of the speech synthesis model;
a first calculation module 5042 configured to use the first sample text and the second sample text as target sample texts sequentially, vectorize a sequence of phonemes corresponding to the target sample texts to obtain a sample phoneme vector at the phoneme level; vectorize the stress labels corresponding to the target sample texts to obtain a sample stress label vector; vectorize the tone labels corresponding to the target sample texts to obtain a sample tone label vector; determine a target sample phoneme vector according to the sample phoneme vector, the sample stress label vector and the sample tone label vector; determine a sample Mel spectrum according to the target sample phoneme vector; and calculate a first loss function according to the sample Mel spectrum and the actual Mel spectrum of the sample audios corresponding to the target sample texts;
an adjustment module 5045 configured to adjust parameters of the speech synthesis model through the first loss function.

In some embodiments of the present disclosure, the speech synthesis model training module 504 may further comprise:
a second stress label generation module 5043 configured to generate a sequence of word vectors corresponding to the first sample text, and generate sample stress labels corresponding to the first sample text according to the stress words marked with the first sample text;
a second calculation module 5044 configured to input the sequence of word vectors into the stress recognition module, and calculate a second loss function according to the result output by the stress recognition module and the sample stress label;
the adjustment module is configured to adjust parameters of the speech synthesis model through the first loss function and the second loss function.

In some embodiments of the present disclosure, the adjustment module is configured to:
perform weighted summation of the first loss function and the second loss function through weight values adaptively changed during the training process to obtain a target loss function;
adjust parameters of the speech synthesis model according to the target loss function.

In some embodiments of the present disclosure, the apparatus 500 may further comprise a stress word determination module 503, which may determine stress words in the text to be synthesized through the following modules:
a third determination submodule 5031 configured to determine whether the text to be synthesized is marked with stress words;
a recognition submodule 5032 configured to identify stress words in the text to be synthesized through the stress recognition module in the speech synthesis model when the text to be synthesized is not marked with stress words;
a fourth determination submodule 5033 configured to, when the text to be synthesized is marked with stress words, determine stress words in the text to be synthesized according to marking information corresponding to the stress words.

Regarding the apparatus in above embodiments, the specific implementations in which various module perform operations have been described in detail in the method embodiments, which will not be set forth in detail here. It should be noted that the division of the above modules does not limit the specific implementations, and the above modules may be implemented in software, hardware, or a combination of software and hardware, for example. In actual implementations, the above modules may be implemented as independent physical entities, or may also be implemented by a single entity (e.g., a processor (CPU or DSP, etc.), an integrated circuit, etc.). It should be noted that although each module is shown as a separate module in FIG. 5, one or more of these modules may also be combined into one module, or split into multiple modules. In addition, the above stress word determination module and speech synthesis model determination module are shown with dotted lines in the drawings to indicate that these modules do not have to be included in the apparatus for speech synthesis, but can be implemented outside the apparatus for speech synthesis or can be implemented by other device outside the apparatus for speech synthesis and informs the apparatus for speech synthesis of the results. Alternatively, the above stress word determination module and speech synthesis model determination module are shown with dotted lines in the drawings to indicate that these modules may not actually exist, and the operations/functions they implement can be implemented by the apparatus for speech synthesis itself.

According to some embodiments of the present disclosure, the embodiments of the present disclosure further provide a computer-readable medium having a computer program stored thereon, which, when executed by a processing apparatus, implements the steps of any of the above methods for speech synthesis.

According to some embodiments of the present disclosure, the embodiments of the present disclosure further provide an electronic device, comprising:
- a storage apparatus having a computer program stored thereon;
- a processing apparatus configured to execute the computer program in the storage apparatus, so as to implement the steps of any of the above methods for speech synthesis.

According to some embodiments of the present disclosure, the present disclosure also provides a computer program product comprising instructions, which, when executed by a computer, cause the computer to implement the steps of any of the above methods for speech synthesis.

Figure 6:
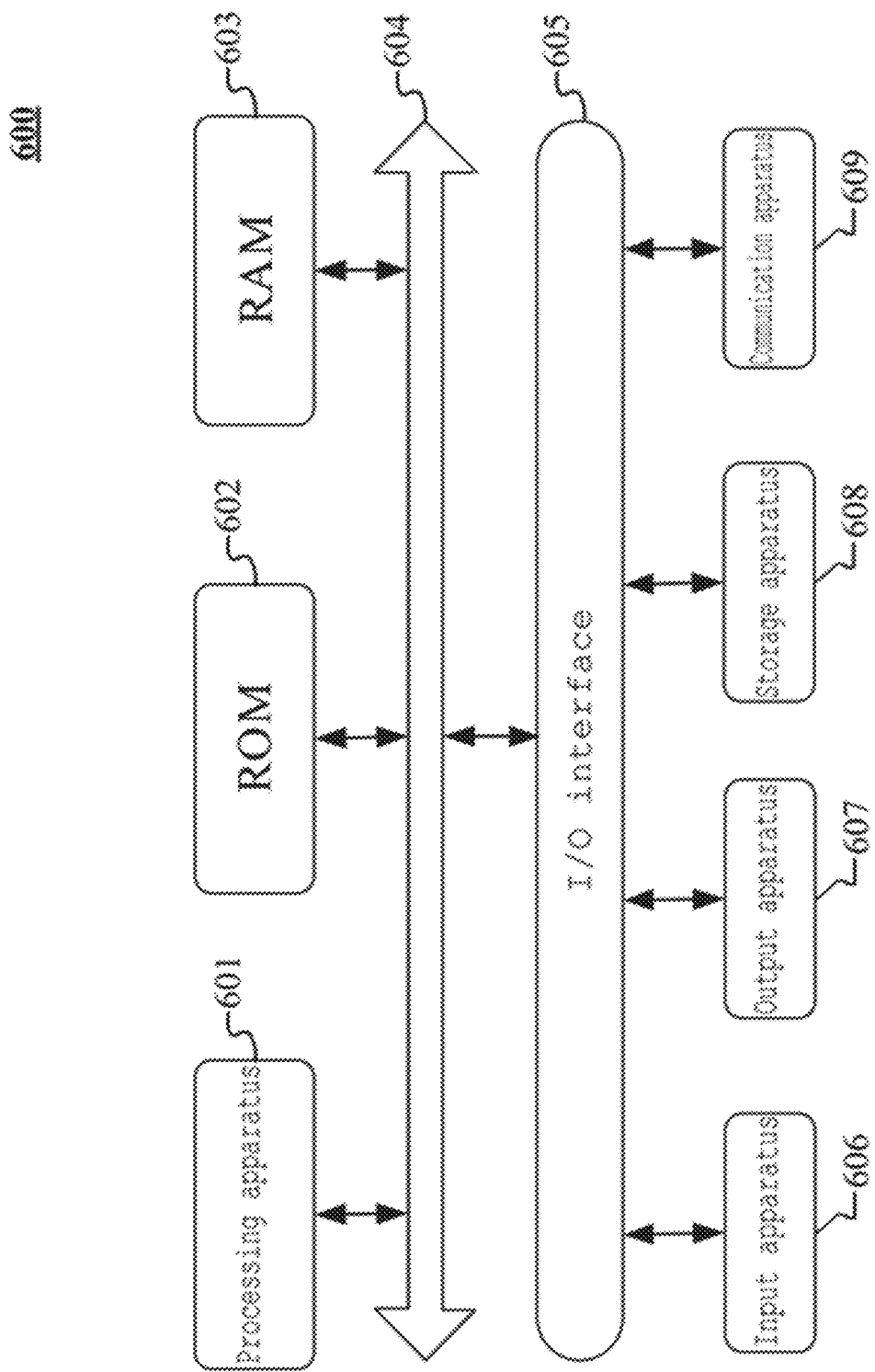
FIG. 6 is a block diagram of an electronic device according to an exemplary embodiment of the present disclosure.

Referring to FIG. 6 below, it shows a schematic structural diagram suitable for implementing an electronic device (e.g., a terminal device or a server in FIG. 1) 600 of an embodiment of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 6 is only one example, and should not bring any limitation to functions and usage scopes of embodiments of the present disclosure.

As shown in FIG. 6, the electronic device 600 may include a processing apparatus (for example a central processing unit, a graphics processor, etc.) 601, which can execute various appropriate actions and processes according to a program stored in a read-only memory (ROM) 602 or a program loaded from a storage 608 into a random-access memory (RAM) 603. In the RAM 603, various programs and data required for the operation of the electronic device 600 are also stored. The processing apparatus 601, ROM 602, and RAM 603 are connected to each other through a bus 604. An input/output (I/O) interface 605 is also connected to the bus 604.

Generally, the following apparatus can be connected to the I/O interface 605: an input device 606 including for example, a touch screen, a touch pad, a keyboard, a mouse, a camera, a microphone, an accelerometer, a gyroscope, etc.; an output device 607 including for example, a liquid crystal display (LCD), a speaker, a vibrator, etc.; a storage 608 including for example, a magnetic tape, a hard disk, etc.; and a communication apparatus 609. The communication apparatus 609 may allow the electronic device 600 to perform wireless or wired communication with other devices to exchange data. Although FIG. 6 shows an electronic device 600 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 609, or installed from the storage 608, or installed from the ROM 602. When the computer program is executed by the processing apparatus 601, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, any currently known or future developed network protocol, such as HTTP (HyperText Transfer Protocol) can be used for communication, and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, causes the electronic device to: acquire a text to be synthesized with a target tone label, the target tone label being a tone label of the first speaker or a tone label of the second speaker; input the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text; the speech synthesis model is configured to determine the stress words in the text to be synthesized, and to generate audio information corresponding to the text to be synthesized according to the stress words and the target tone label.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure can be implemented in software or hardware. Wherein, the name of the module does not constitute a limitation on the module itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Exemplary Embodiment 1 provides a method for speech synthesis, the method comprising:

acquiring a text to be synthesized with a target tone label, the target tone label being a tone label of a first speaker or a tone label of a second speaker;

inputting the text to be synthesized into a speech synthesis model to obtain audio information corresponding to the text to be synthesized, training samples of the speech synthesis model including a first sample text marked with stress words and a first sample audio of the first speaker for the first sample text, and a second sample text with no stress word marked and a second sample audio of the second speaker for the second sample text; and the speech synthesis model is configured to determine stress words in the text to be synthesized, and to generate audio information corresponding to the text to be synthesized according to the stress words and the target tone label.

According to one or more embodiments of the present disclosure, Exemplary Embodiment 2 provides the method of Exemplary Embodiment 1, wherein the speech synthesis model generates audio information corresponding to the text to be synthesized by:

determining a sequence of phonemes corresponding to the text to be synthesized;

determining phoneme level stress labels according to the stress words; and generating audio information corresponding to the text to be synthesized according to the sequence of phonemes corresponding to the text to be synthesized, the stress labels and the target tone label.

According to one or more embodiments of the present disclosure, Exemplary Embodiment 3 provides the method of Exemplary Embodiment 2, wherein the generating audio information corresponding to the text to be synthesized according to the sequence of phonemes, the stress labels and the target tone label comprises:

vectorizing the sequence of phonemes to obtain a phoneme vector;

vectorizing the stress labels to obtain a stress label vector;

vectorizing the target tone label to obtain a tone label vector;

determining a target phoneme vector according to the phoneme vector, the stress label vector and the tone label vector;

determining a Mel spectrum according to the target phoneme vector; and inputting the Mel spectrum into a vocoder to obtain audio information corresponding to the text to be synthesized.

According to one or more embodiments of the present disclosure, Exemplary Embodiment 4 provides the method of Exemplary Embodiment 3, wherein the determining the Mel spectrum according to the target phoneme vector comprises:
inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 5 provides the method of Exemplary Embodiment 3, wherein the determining a target phoneme vector according to the phoneme vector, the stress label vector, and the tone label vector comprises:
inputting the phoneme vector into an encoder, and determining the target phoneme vector according to the vector output by the encoder, the stress label vector and the tone label vector;
wherein the determining a Mel spectrum according to the target phoneme vector comprises:
inputting the target phoneme vector into a decoder to obtain the Mel spectrum;
wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 6 provides the method of any of Exemplary Embodiments 1 to 5, wherein the speech synthesis model includes a stress recognition module, and the steps for training the speech synthesis model comprises:
generating stress labels corresponding to the second sample text through the stress recognition module;
using the first sample text and the second sample text as target sample texts sequentially, vectorizing a sequence of phonemes corresponding to the target sample texts to obtain a sample phoneme vector at the phoneme level; vectorizing the stress labels corresponding to the target sample texts to obtain a sample stress label vector; vectorizing the tone labels corresponding to the target sample texts to obtain a sample tone label vector; determining a target sample phoneme vector according to the sample phoneme vector, the sample stress label vector and the sample tone label vector; determining a sample Mel spectrum according to the target sample phoneme vector; and calculating a first loss function according to the sample Mel spectrum and the actual Mel spectrum of the sample audios corresponding to the target sample texts; and
adjusting parameters of the speech synthesis model through the first loss function.

According to one or more embodiments of the present disclosure, Exemplary Embodiment 7 provides the method of Exemplary Embodiment 6, wherein the steps for training further comprises:
generating a sequence of word vectors corresponding to the first sample text, and generating sample stress labels corresponding to the first sample text according to the stress words marked with the first sample text;
inputting the sequence of word vectors into the stress recognition module, and calculating a second loss function according to the result output by the stress recognition module and the sample stress label;
wherein the adjusting parameters of the speech synthesis model through the first loss function comprises:
adjusting parameters of the speech synthesis model through the first loss function and the second loss function.

According to one or more embodiments of the present disclosure, Exemplary Embodiment 8 provides the method of Exemplary Embodiment 7,
wherein the adjusting the parameters of the speech synthesis model through the first loss function and the second loss function comprises:
performing weighted summation of the first loss function and the second loss function through weight values adaptively changed during the training process to obtain a target loss function;
adjusting parameters of the speech synthesis model according to the target loss function.

According to one or more embodiments of the present disclosure, Exemplary Embodiment 9 provides the method of Exemplary Embodiment 6, wherein the determining stress words in the text to be synthesized comprises:
determining whether the text to be synthesized is marked with stress words;
if the text to be synthesized is not marked with stress words, identifying stress words in the text to be synthesized through the stress recognition module; and
if the text to be synthesized is marked with stress words, determining stress words in the text to be synthesized according to marking information corresponding to the stress words.

According to one or more embodiments of the present disclosure, Exemplary Embodiment 10 provides an apparatus for speech synthesis, the apparatus comprising:
an acquisition module configured to acquire a text to be synthesized with a target tone label, the target tone label being a tone label of a first speaker or a tone label of a second speaker;
a synthesis module configured to input the text to be synthesized into a speech synthesis model to obtain audio information corresponding to the text to be synthesized;
wherein, training samples of the speech synthesis model including a first sample text marked with stress words and a first sample audio of the first speaker for the first sample text, and a second sample text with no stress word marked and a second sample audio of the second speaker for the second sample text;
the speech synthesis model is configured to determine stress words in the text to be synthesized, and to generate audio information corresponding to the text to be synthesized according to the stress words and the target tone label.

According to one or more embodiments of the present disclosure, Exemplary Embodiment 11 provides the apparatus of Exemplary Embodiment 10, wherein the speech synthesis model generates audio information corresponding to the text to be synthesized through the following modules:
a first determination submodule configured to determine a sequence of phonemes corresponding to the text to be synthesized;

a second determination submodule configured to determine phoneme level stress labels according to the stress words; and a generation submodule configured to generate audio information corresponding to the text to be synthesized according to the sequence of phonemes corresponding to the text to be synthesized, the stress labels and the target tone label.

According to one or more embodiments of the present disclosure, Exemplary Embodiment 12 provides the apparatus of Exemplary Embodiment 11, wherein the generation submodule is configured to:

vectorize the sequence of phonemes corresponding to the text to be synthesized to obtain a phoneme vector;

vectorize the stress labels to obtain a stress label vector;

vectorize the target tone label to obtain a tone label vector;

determine a target phoneme vector according to the phoneme vector, the stress label vector and the tone label vector;

determine a Mel spectrum according to the target phoneme vector;

input the Mel spectrum into a vocoder to obtain audio information corresponding to the text to be synthesized.

According to one or more embodiments of the present disclosure, Exemplary Embodiment 13 provides the apparatus of Exemplary Embodiment 12, wherein the generation submodule is configured to:

input the target phoneme vector into an encoder, and input a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 14 provides the apparatus of Exemplary Embodiment 12, wherein the generation submodule is configured to:

input the phoneme vector into an encoder, and determine the target phoneme vector according to the vector output by the encoder, the stress label vector and the tone label vector;

input the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 15 provides the apparatus of any of Exemplary Embodiments 10 to 14, wherein the speech synthesis model comprises a stress recognition module, and the apparatus 500 further comprises following modules for training the speech synthesis model:

a first sample generation module configured to generate stress labels corresponding to the second sample text through the stress recognition module of the speech synthesis model;

a first calculation module configured to use the first sample text and the second sample text as target sample texts sequentially, vectorize a sequence of phonemes corresponding to the target sample texts to obtain a sample phoneme vector at the phoneme level; vectorize the stress labels corresponding to the target sample texts to obtain a sample stress label vector; vectorize the tone labels corresponding to the target sample texts to obtain a sample tone label vector; determine a target sample phoneme vector according to the sample phoneme vector, the sample stress label vector and the sample tone label vector; determine a sample Mel spectrum according to the target sample phoneme vector; and calculate a first loss function according to the sample Mel spectrum and the actual Mel spectrum of the sample audios corresponding to the target sample texts;

an adjustment module configured to adjust parameters of the speech synthesis model through the first loss function.

According to one or more embodiments of the present disclosure, Exemplary Embodiment 16 provides the apparatus of Exemplary Embodiment 15, further comprising following modules for training the speech synthesis model:

a second sample generation module configured to generate a sequence of word vectors corresponding to the first sample text, and generate sample stress labels corresponding to the first sample text according to the stress words marked with the first sample text;

a second calculation module configured to input the sequence of word vectors into the stress recognition module, and calculate a second loss function according to the result output by the stress recognition module and the sample stress label;

the adjustment module is configured to adjust parameters of the speech synthesis model through the first loss function and the second loss function.

According to one or more embodiments of the present disclosure, Exemplary Embodiment 17 provides the apparatus of Exemplary Embodiment 16, wherein the adjustment module is configured to:

perform weighted summation of the first loss function and the second loss function through weight values adaptively changed during the training process to obtain a target loss function;

adjust parameters of the speech synthesis model according to the target loss function.

According to one or more embodiments of the present disclosure, Exemplary Embodiment 18 provides the apparatus of Exemplary Embodiment 15, wherein the speech synthesis model determines stress words in the text to be synthesized through following modules:

a third determination submodule configured to determine whether the text to be synthesized is marked with stress words;

a recognition submodule configured to identify stress words in the text to be synthesized through the stress recognition module in the speech synthesis model when the text to be synthesized is not marked with stress words;

a fourth determination submodule configured to, when the text to be synthesized is marked with stress words, determine stress words in the text to be synthesized according to marking information corresponding to the stress words.

According to one or more embodiments of the present disclosure, Exemplary Embodiment 19 provides a non-transitory computer-readable medium having a computer program stored thereon, which, when executed by a processing apparatus, implements the steps of the methods for speech synthesis in any of Exemplary Embodiments 1 to 9.

According to one or more embodiments of the present disclosure, Exemplary Embodiment 20 provides an electronic device comprising:
- a storage apparatus having a computer program stored thereon;
- a processing apparatus configured to execute the computer program in the storage apparatus, so as to implement the steps of the methods for speech synthesis in any of the Exemplary Embodiments 1 to 9.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs operations has been described in detail in the method embodiments, which will not be described in detail here.

What is claimed is:

1. A method for speech synthesis, the method comprising:
inputting a plurality of training samples into a speech synthesis model for training the speech synthesis model, wherein the plurality of training samples comprise a first training sample, the first training sample comprising a first sample text with stress labels and a first sample audio of speaking the first sample text with a first tone, and wherein the plurality of training samples comprises a second training sample, the second training sample comprising a second sample text and a second sample audio of speaking the second sample text with a second tone;
generating a stress label vector based on vectorizing the stress labels corresponding to the first sample text and stress labels corresponding to the second sample text, wherein the stress labels corresponding to the second sample text are generated by the speech synthesis model;
generating a phoneme vector based on vectorizing a sequence of phonemes corresponding to the first sample text and the second sample text;
generating a tone label vector based on vectorizing tone labels, wherein the tone labels are extracted from the first sample audio and the second sample audio;
determining a Mel spectrum based on the phoneme vector, the stress label vector, and the tone label vector;
adjusting parameters of the speech synthesis model based at least in part on the Mel spectrum and at least one loss function to obtain a trained speech synthesis model;
acquiring a text to be synthesized with a target tone label, the target tone label indicating a target tone of a first speaker or a target tone of a second speaker; and
inputting the text to be synthesized into the trained speech synthesis model to generate audio corresponding to the text, wherein the generated audio has the target tone and stressed pronunciation.

2. The method according to claim 1, further comprising:
wherein the trained speech synthesis model generates the audio corresponding to the text to be synthesized by:
determining a sequence of phonemes corresponding to the text to be synthesized;
determining phoneme level stress labels according to the stress words; and
generating the audio corresponding to the text to be synthesized according to the sequence of phonemes, the stress labels and the target tone label.

3. The method according to claim 2, wherein the generating audio corresponding to the text to be synthesized according to the sequence of phonemes, the stress label and the target tone label comprises:
vectorizing the sequence of phonemes to obtain a phoneme vector;
vectorizing the stress labels to obtain a stress label vector;
vectorizing the target tone label to obtain a tone label vector;
determining a target phoneme vector according to the phoneme vector, the stress label vector and the tone label vector;
determining a Mel spectrum according to the target phoneme vector; and
inputting the Mel spectrum into a vocoder to obtain the audio corresponding to the text to be synthesized.

4. The method according to claim 3, wherein the determining the Mel spectrum according to the target phoneme vector comprises:
inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

5. The method according to claim 4, wherein the target phoneme vector is obtained by splicing the phoneme vector, the stress label vector and the tone label vector.

6. The method according to claim 3, wherein the determining a target phoneme vector according to the phoneme vector, the stress label vector and the tone label vector comprises:

inputting the phoneme vector into an encoder, and determining the target phoneme vector according to the vector output by the encoder, the stress label vector and the tone label vector;

wherein the determining a Mel spectrum according to the target phoneme vector comprises:

inputting the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

7. The method according to claim 6, wherein the target phoneme vector is obtained by splicing the vector output by the encoder, the stress label vector and the tone label vector.

8. The method according to claim 1, wherein the at least one loss function comprises a first loss function, the method further comprising:

determining a target sample phoneme vector based on the phoneme vector, the stress label vector, and the tone label vector, wherein determining the Mel spectrum comprises determining the Mel spectrum based on the target sample phoneme vector; and calculating the first loss function based on the Mel spectrum and the actual Mel spectrum of the sample audios corresponding to the target sample texts.

9. The method according to claim 8, wherein the plurality of first sample texts are a plurality of texts including different contents and the texts including the same content are marked initial stress labels by different users.

10. The method according to claim 8, wherein the process of training the speech synthesis model further comprises steps of:

generating a sequence of word vectors corresponding to the first sample text, and generating sample stress labels corresponding to the first sample text according to the stress words marked with the first sample text;

inputting the sequence of word vectors into the stress recognition module, and calculating a second loss function according to the result output by the stress recognition module and the sample stress label;

wherein the adjusting parameters of the speech synthesis model through the first loss function comprises:

adjusting parameters of the speech synthesis model through the first loss function and the second loss function.

11. The method according to claim 10, wherein the adjusting parameters of the speech synthesis model through the first loss function and the second loss function comprises:

performing weighted summation of the first loss function and the second loss function through weight values adaptively changed during the training process to obtain a target loss function;

adjusting parameters of the speech synthesis model according to the target loss function.

12. The method according to claim 2, wherein the stress words in the text to be synthesized are determined by steps of:

determining whether the text to be synthesized is marked with stress words;

in response to determine that the text to be synthesized is not marked with stress words, identifying stress words in the text to be synthesized through a stress recognition module; and in response to determine that the text to be synthesized is marked with stress words, determining stress words in the text to be synthesized according to marking information corresponding to the stress words.

13. A non-transitory computer-readable medium having computer programs stored thereon, which, when executed by a processing apparatus, execute operations comprising:

inputting a plurality of training samples into a speech synthesis model for training the speech synthesis model, wherein the plurality of training samples comprise a first training sample, the first training sample comprising a first sample text with stress labels and a first sample audio of speaking the first sample text with a first tone, and wherein the plurality of training samples comprises a second training sample, the second training sample comprising a second sample text and a second sample audio of speaking the second sample text with a second tone;

generating a stress label vector based on vectorizing the stress labels corresponding to the first sample text and stress labels corresponding to the second sample text, wherein the stress labels corresponding to the second sample text are generated by the speech synthesis model;

generating a phoneme vector based on vectorizing a sequence of phonemes corresponding to the first sample text and the second sample text;

generating a tone label vector based on vectorizing tone labels, wherein the tone labels are extracted from the first sample audio and the second sample audio;

determining a Mel spectrum based on the phoneme vector, the stress label vector, and the tone label vector;

adjusting parameters of the speech synthesis model based at least in part on the Mel spectrum and at least one loss function to obtain a trained speech synthesis model;

acquiring a text to be synthesized with a target tone label, the target tone label indicating a target tone of a first speaker or a target tone of a second speaker; and inputting the text to be synthesized into the trained speech synthesis model to generate audio corresponding to the text, wherein the generated audio has the target tone and stressed pronunciation.

14. An electronic device comprising:

a storage apparatus having a computer program stored thereon;

a processing apparatus configured to execute the computer program in the storage apparatus, so as to execute operations comprising:

inputting a plurality of training samples into a speech synthesis model for training the speech synthesis model, wherein the plurality of training samples comprise a first training sample, the first training sample comprising a first sample text with stress labels and a first sample audio of speaking the first sample text with a first tone, and wherein the plurality of training samples comprises a second training sample, the second training sample comprising a second sample text and a second sample audio of speaking the second sample text with a second tone;

generating a stress label vector based on vectorizing the stress labels corresponding to the first sample text and stress labels corresponding to the second sample text, wherein the stress labels corresponding to the second sample text are generated by the speech synthesis model;

generating a phoneme vector based on vectorizing a sequence of phonemes corresponding to the first sample text and the second sample text;

generating a tone label vector based on vectorizing tone labels, wherein the tone labels are extracted from the first sample audio and the second sample audio;

determining a Mel spectrum based on the phoneme vector, the stress label vector, and the tone label vector;

adjusting parameters of the speech synthesis model based at least in part on the Mel spectrum and at least one loss function to obtain a trained speech synthesis model;

acquiring a text to be synthesized with a target tone label, the target tone label indicating a target tone of a first speaker or a target tone of a second speaker; and inputting the text to be synthesized into the trained speech synthesis model to generate audio corresponding to the text, wherein the generated audio has the target tone and stressed pronunciation.

15. The electronic device according to claim 14, the operations further comprising:

wherein the trained speech synthesis model is configured to generate the audio corresponding to the text to be synthesized by:

determining a sequence of phonemes corresponding to the text to be synthesized;

determining phoneme level stress labels according to the stress words; and generating the audio corresponding to the text to be synthesized according to the sequence of phonemes, the stress labels and the target tone label.

16. The electronic device according to claim 15, wherein the generating the audio corresponding to the text to be synthesized according to the sequence of phonemes, the stress label and the target tone label comprises:

vectorizing the sequence of phonemes to obtain a phoneme vector;

vectorizing the stress labels to obtain a stress label vector;

vectorizing the target tone label to obtain a tone label vector;

determining a target phoneme vector according to the phoneme vector, the stress label vector and the tone label vector;

determining a Mel spectrum according to the target phoneme vector; and inputting the Mel spectrum into a vocoder to obtain the audio corresponding to the text to be synthesized.

17. The electronic device according to claim 16, wherein the determining the Mel spectrum according to the target phoneme vector comprises:

inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

18. The electronic device according to claim 16, wherein the determining a target phoneme vector according to the phoneme vector, the stress label vector and the tone label vector comprises:

inputting the phoneme vector into an encoder, and determining the target phoneme vector according to the vector output by the encoder, the stress label vector and the tone label vector;

wherein the determining a Mel spectrum according to the target phoneme vector comprises:

inputting the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

19. The electronic device according to claim 14, wherein the at least one loss function comprises a first loss function, the operations further comprising:

determining a target sample phoneme vector based on the phoneme vector, the stress label vector and the tone label vector, wherein determining the Mel spectrum comprises determining the Mel Spectrum based on to the target sample phoneme vector; and calculating the first loss function based on the Mel spectrum and the actual Mel spectrum of the sample audios corresponding to the target sample texts.

20. The electronic device according to claim 15, wherein the stress words in the text to be synthesized are determined by steps of:

determining whether the text to be synthesized is marked with stress words;

in response to determine that the text to be synthesized is not marked with stress words, identifying stress words in the text to be synthesized through a stress recognition module; and in response to determine that the text to be synthesized is marked with stress words, determining stress words in the text to be synthesized according to marking information corresponding to the stress words.

* * * * *